United States Patent [19]

Swilley

[11] Patent Number: 4,707,885

[45] Date of Patent: Nov. 24, 1987

[54] HEAD HOLD DOWN FOR HIDE PULLER

[75] Inventor: Wilson H. Swilley, Persia, Iowa

[73] Assignee: The Cincinnati Butchers' Supply Company, Cincinnati, Ohio

[21] Appl. No.: 944,412

[22] Filed: Dec. 19, 1986

[51] Int. Cl.[4] ............................ A22B 1/00; A22B 5/16
[52] U.S. Cl. ........................................ 17/21; 17/1 A
[58] Field of Search ....................... 17/1 A, 21, 12, 44, 17/14

[56] References Cited

U.S. PATENT DOCUMENTS

| 2,912,715 | 11/1959 | Moss | 17/1 A |
| 3,129,454 | 4/1964 | Johnson | |
| 3,237,603 | 3/1966 | Markegard | 17/1 A X |
| 4,257,143 | 3/1981 | Lewis | 17/12 |
| 4,392,274 | 7/1983 | Norøy | |
| 4,438,546 | 3/1984 | Couture | 17/21 X |

Primary Examiner—Willie G. Abercrombie
Attorney, Agent, or Firm—Lloyd L. Zickert

[57] ABSTRACT

A head hold down device for holding the head during an up hide-pulling operation, which includes a pair of parallel bars extending substantially parallel to an overhead track conveyor where one of the bars is in fixed position and the other is movable for purposes of gripping and releasing the head of an animal carcass during the up hide-stripping operation. The hold down device is adjustable along the vertical to accommodate animal carcasses of various sizes.

10 Claims, 6 Drawing Figures

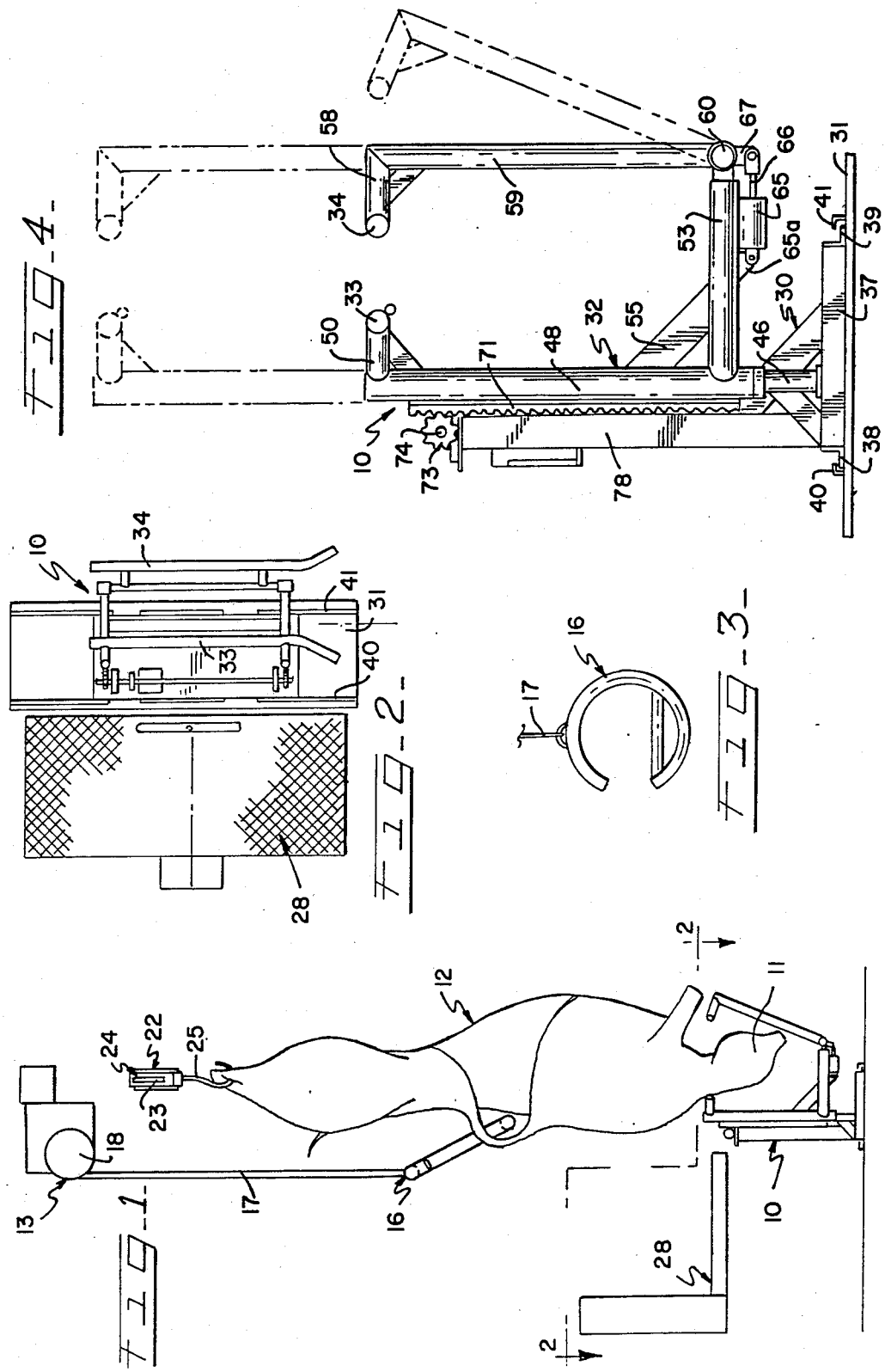

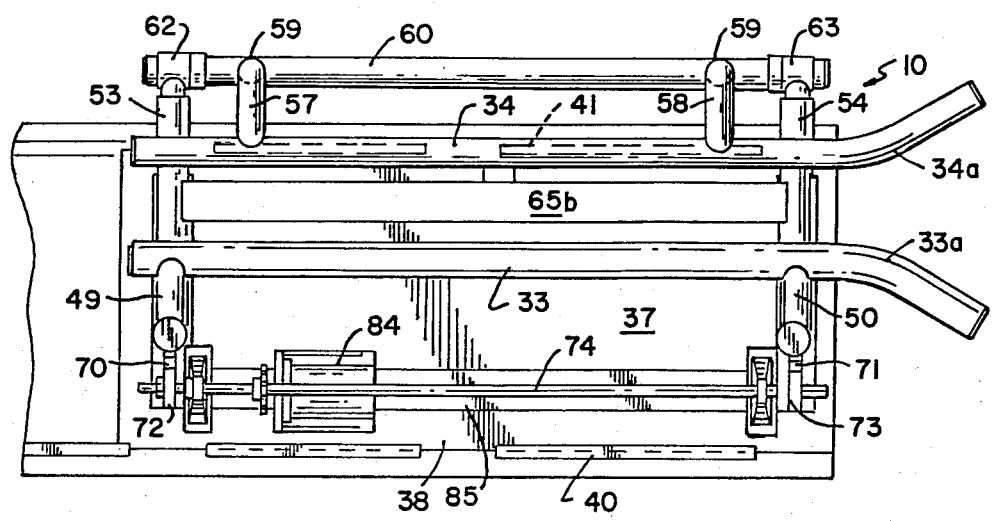
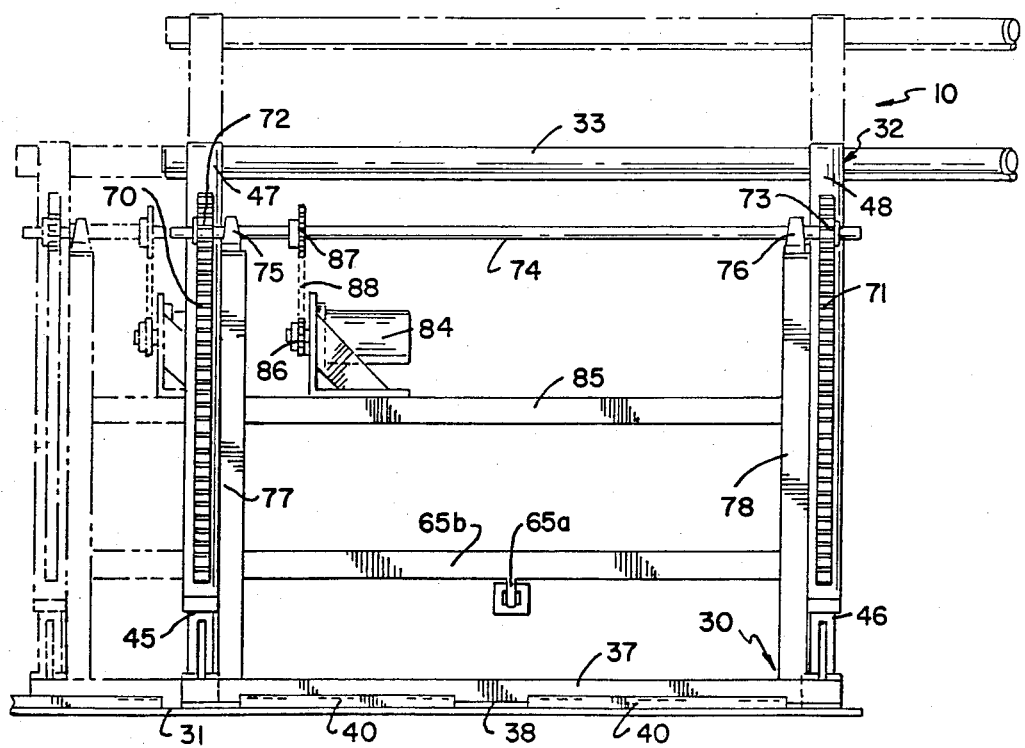

HEAD HOLD DOWN FOR HIDE PULLER

DESCRIPTION

This invention relates in general to a head hold down device for holding the head of an animal carcass suspended from an animal conveyer during an up hide-pulling operation, and more particularly to a head hold down device that is easily and quickly operated and which minimizes the number of operators for effecting the head hold down function.

BACKGROUND OF THE INVENTION

One of the operations in the slaughtering of animals is to remove the hide from the carcass. This may be accomplished by manually stripping or skinning the animal carcass or by power driven hide-pulling machines. Such machines are positioned at a work station along the path which the animal carcasses travel during movement of an animal carcass between work stations. Normally, the animal carcass is suspended from an overhead track or rail with the head disposed downwardly and the rear legs fastened to trolleys movable along the track. Thus, the animal carcasses are suspended from an overhead conveyer and movable by the conveyer between work stations.

Hide pullers are employed to pull or strip hide from an animal carcass. Such pullers may take the form of an up puller or a down puller, and they also may strip all or part of the hide from the animal during their hidestripping operation. One common type of up puller is disposed between the hide and the back of an animal and then subjected to upward movement to strip the hide from about the middle of the back to the ends of the rear legs. This type of puller is referred to as an up puller and accomplishes partial stripping of the hide from the animal. While of no particular consequence herein, the remainder of the hide may be stripped by a down hide-pulling operation at a subsequent work station.

One up-pulling system first requires a loosening of the skin at the back of the animal so that the puller can be inserted between the skin and the animal. This puller is defined as a banana bar up puller which, when completing its operation, leaves the hide still attached at the lower end of the body or the head end of the body. In order to make the banana bar up puller effective, it is necessary to anchor the lower end of the animal carcass. This is commonly done by attaching chains to the front legs and which are suitably anchored to the floor or any other type of suitable structure, as seen in U.S. Pat. No. 3,129,454. Connection or attachment of the chains to the animal carcass requires two operators in order to obtain any acceptable production, one to connect a chain to one of the forelegs and the other to connect a chain to the other of the forelegs. Another device for anchoring the lower end of a carcass grips the front legs with suitable jaws, as in U.S. Pat. No. 4,392,274, this device also requiring the manipulation of both front legs.

SUMMARY OF THE INVENTION

The head hold down of the present invention obviates the difficulties heretofore encountered in providing a device that may be operated by a single person for accomplishing the hold down operation of the animal carcass. Thus, the hold down step of the animal carcass can be more efficiently and easily handled which reduces the time needed for the overall up hide-pulling operation at the up hide puller, thereby increasing the production rate for slaughtering animal carcasses. The hold down device of the present invention eliminates the need to attach chains to the front legs of the animal carcass or to manipulate the front legs for anchoring the carcass. More particularly, the head hold down device effectively grasps the head of the animal carcass which is at the downward end of the suspended animal carcass, and which adequately holds the carcass in place during the up pulling of a hide puller for removing the hide from the rear end of the animal carcass. Moreover, the head hold down device of the present invention is vertically adjustable to accommodate animals of various sizes. It is also automatically adjustable for head size by being fluid driven.

It is therefore an object of the present invention to provide a new and improved device for anchoring the lower end of an animal carcass during an up hide-pulling operation.

A further object of the present invention is to provide a head hold down device for restraining the lower hanging end of an animal carcass during an up hide-pulling operation.

A still further object of the present invention is to provide a head hold down device for anchoring the head of an animal suspended from an overhead track during a hide-pulling operation and which device may be easily and efficiently actuated by a single operator and which increases the speed of the slaughter line.

A further object of the present invention is to provide a head hold down device for restraining the head of an animal carcass suspended from an overhead conveyer which can be remotely operated by an operator, thereby removing the operator from precarious and dangerous areas around where the hide-pulling operation is carried out and thereby placing the operator at a location outside of where the banana bar of the hide puller and the animal carcass suspended from the overhead conveyer may accidentally fall.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 1 is a vertical side elevational view of the head hold down device of the present invention in released or open position for receiving the head of an animal and illustrating the manner in which the banana bar is fitted between the animal back and the hide for an up hide-pulling operation;

FIG. 2 is a top plan view of the head hold down device of the invention and looking generally along line 2—2 of FIG. 1;

FIG. 3 is a front elevational view of the banana bar stripper according to the invention;

FIG. 4 is an enlarged side elevational view of the animal head hold device of the present invention and illustrating in phantom lines the device in raised position and also with the movable bar in open position;

FIG. 5 is a top plan view of the hold down device shown in FIG. 4; and

FIG. 6 is a rear elevational view of the device shown in FIGS. 4 and 5 and illustrating the drive mechanism for changing the elevation of the hold down bars.

DESCRIPTION OF THE INVENTION

Referring now to the drawings, and particularly to FIG. 1, the head hold down device of the present invention, generally indicated by the numeral 10, is shown in association with the head 11 of an animal carcass 12 at a hidepulling work station. The head hold down device is illustrated in open or released position, while in FIG. 4 it is shown in closed position in solid lines and in open position in phantom. A hide-pulling device, generally indicated by the numeral 13, is shown at the work station and is in the form of the well known banana bar up puller. As will be more apparent hereafter, the head hold down device restrains the lower end of the animal carcass during the up hide-pulling operation by the hide puller 13. The form of the up hide puller is not part of the present invention, as any type of up hide puller may be used with the present invention.

The banana bar pulling device includes a banana bar puller 16 connected to the end of a cable 17 that extends from a host or winch 18 which is controlled by an operator at the hide-pulling station.

The animal carcass 12 is supported by and movable along an overhead conveyer 22 which is in the form of an overhead track or rail 23 supporting trolley devices 24 having downwardly extending hooks 25 for connecting to the rear legs of an animal carcass in the well known fashion. While not shown, any sort of drive mechanism may be provided for moving the trolleys along the rail as the carcass is moved between the work stations in the slaughterhouse.

Thus, the animal carcass is suspended from an overhead conveyer and anchored at the lower end by the head hold down device 10 during the up hide-pulling operation by the banana bar puller 16. As seen in FIG. 1, the hide at the central area of the back of the animal carcass is loosened so that the banana bar puller can be inserted and thereafter winched upwardly to strip the hide from the rear end of the animal carcass. It will be appreciated that the banana bar hide-pulling device is well known and that other types of up hidepulling devices may be employed for stripping the hide from the rear end of the animal carcass. Further, between stripping operations, the banana bar is sterilized by the sterilizer 28 which is disposed at the hide-pulling work station.

Referring now particularly to FIGS. 4 to 6, the head hold down device 10 of the invention generally includes a base 30 mounted on the floor 31 against upward movement and a cariage or frame 32 mounted on the base and substantially vertically movable relative to the base. First and second head hold down bars 33 and 34 are mounted on the carriage 32.

The base 30 includes a base plate 37 having opposed flanges 38 and 39 slidably received along the floor between floor mounted coacting retaining flanges 40 and 41 which, while allowing slidable movement of the hold down device, prevents it from moving vertically upward. The purpose of the sliding arrangement is to enable movement of the hold down device from one position to another for facilitating the gripping of the head of an animal carcass that may be aligned with one of two adjacent up hide pullers or for any other reason.

At opposite ends of the base plate 37, upwardly extending posts 45 and 46 telescopically and guidably receive hollow tubular members 47 and 48 of the carriage 32. The first hold down bar 33 is secured at opposite ends to the tubular members by short horizontally extending tubular members 49 and 50, thus, spacing the first hold down bar 33 inwardly of the tubular guide members 47 and 48, as seen in FIG. 4.

Extending from the lower ends of the tubular members 47 and 48 are supporting frame members 53 and 54 suitably reinforced by diagonal reinforcing plates 55. Members 53 and 54 extend horizontally and have pivotally mounted at their outer ends the second hold down bar 34. When in closed position, the second hold down bar 34, as seen in FIG. 4 is disposed opposite to the first hold down bar 33 and coacts therewith to grip the neck of an animal carcass to restrain the head. The bar 34 is supported at the ends of short horizontally extending frame members 57 and 58, as seen in FIG. 5, each of which is secured at the upper end of a vertically extending frame member 59. The lower ends of the frame members 59 are interconnected by longitudinally connecting frame member 60 that is pivotally carried by bearings 62 and 63 mounted at the ends of frame members 53 and 54. Thus, through the frame members 57, 58, 59 and 60 the second hold down bar 34 is pivotally mounted relative to the first hold down bar 33 between gripping and releasing positions, as illustrated in FIG. 4.

A hydraulic cylinder 65 mounted at one end to a lug 65a carried on a cross member 65b extending between the frame members 53 and 54 includes a piston rod 66 pivotally connected to an arm 67 extending from the frame member 60, whereby operation of hydraulic cylinder 65 causes movement of the movable head hold down bar 34 between gripping and releasing positions. A pneumatic cylinder or other power device may be used in place of the hydraulic cylinder. The operation of whatever power device chosen will be set up to automatically compensate for different neck sizes.

The carriage 32 is vertically adjustable relative to the base 30 for purposes of accommodating animal carcasses of different sizes and particularly different lengths as suspended from the overhead conveyer. The mechanism for adjusting the height of the carriage 32 includes rack gears 70 and 71 respectively mounted on the vertically extending hollow tubular members 47 and 48 of the carriage and pinion gears 72 and 73 in engagement with the rack gears and mounted on and suitably connected to a drive shaft 74 for corotation therewith. Rotatably mounting the drive shaft 74 on the base 30 are bearing members 75 and 76 supported at the upper ends of columns 77 and 78 respectively that are secured to the base plate 37. A hydraulic motor 84 supported on a cross member 85 extending between the columns 77 and 78 includes a drive sprocket 86 connected to a driven sprocket 87 on the shaft 84 through a chain 88. Thus, operation of the hydraulic motor 85 rotates the pinion gear shaft 74 to selectively raise or lower the carriage 32 in a manner that efficiently accommodates animal carcasses of various sizes. Controls for cylinder 65 and motor 85 would be remotely located out of the area where the banana bar or carcass may accidentally fall.

While not shown, the power device for raising or lowering the carriage 32 and the elevation of the bars may take other forms. For example, a single hydraulic cylinder applying its drawing force centrally between the members 47 and 48 could be used. In that event, the pinion gears and racks would serve to assist in maintaining the carriage movement uniform.

The hydraulic cylinder 65 and the hydraulic motor 84 may be of any other suitable type to provide the desired mechanical movements for respectively pivoting the second hold down bar 34 and rotating the pinion gear shaft 74.

The entry ends of the hold down bars 33 and 34 are flared or bent outwardly at 33a and 34a for purposes of assisting the guidance of the animal carcass into the head hold down device as it is conveyed to the hide-pulling station.

It will now be appreciated that only a single operator need be present to operate the head hold down device, thereby eliminating a second operator. It is only necessary for the operator to operate the controls of the hold down device to raise and lower the bars and to pivot bar 34 so that the closing of the hold down bars grips the neck of the animal carcass and prevents the head from moving upwardly when the hide-stripping operation is accomplished.

It will be understood that modifications and variations may be effected without departing from the scope of the novel concepts of the present invention, but it is understood that this application is to be limited only by the scope of the appended claims.

The invention is hereby claimed as follows:

1. In combination with an overhead conveyer for supporting animal carcasses with their heads down and conveying same along work stations and an up hide puller adjacent said conveyer at an up hide pulling work station, means mounted on the floor for holding the lower end of the carcass at the head during an up hide pulling operation, said holding means comprising, a first bar extending substantially parallel to the direction of carcass travel and spaced above the floor at a level substantially at the neck of the carcass, a second bar coacting with said first bar to selectively engage a carcass neck and hold the head at the lower end of the carcass against upward movement, said second bar extending substantially parallel to said first bar and being movable between gripping and releasing positions, and means for actuating said movable bar.

2. The combination of claim 1, which further includes means for variably adjusting the height of said bars to accommodate animal carcasses of various sizes.

3. The combination of claim 1, wherein said bars are flared at their entry end to assist guiding the carcasses into position therebetween.

4. The combination of claim 1, wherein said actuating means is hydraulically driven.

5. The combination of claim 2, wherein said adjustment means is hydraulically driven.

6. The combination of claim 1, wherein said second bar is pivotally mounted relative to said first bar to swing between gripping and releasing positions.

7. The combination of claim 1, wherein means is further provided for permitting the holding means to be moved laterally along the path of the animal carcass while being held against upward movement from the floor.

8. In combination with an overhead conveyer for supporting animal carcasses with their heads down and conveying same along work stations and an up hide puller adjacent said conveyer at an up hide pulling work station, a floor mounted head hold down device in working alignment with said conveyer and hide puller for selectively gripping the neck of an animal carcass at the work station during operation of the hide puller, said device comprising a base mounted on the floor against upward movement, a vertically movable carriage on said base, said carriage having first and second parallel extending hold down bars, said bars paralleling the path of carcass travel, one of said bars being stationary and the other being movable between gripping and releasing positions, power means for driving the movable bar, and power means for vertically adjusting the height of the carriage and bars.

9. The combination of claim 8, wherein said head hold down device is mounted on the floor for limited movement along the path of carcass travel to align with a hide puller.

10. The combination of claim 8, wherein said movable bar is pivotally mounted on said carriage.

* * * * *